United States Patent [19]

Brokaw et al.

[11] Patent Number: 4,475,103

[45] Date of Patent: Oct. 2, 1984

[54] INTEGRATED-CIRCUIT THERMOCOUPLE SIGNAL CONDITIONER

[75] Inventors: Adrian P. Brokaw, Burlington, Mass.; Barrie Gilbert, Forest Grove, Oreg.

[73] Assignee: Analog Devices Incorporated, Norwood, Mass.

[21] Appl. No.: 352,711

[22] Filed: Feb. 26, 1982

[51] Int. Cl.³ .................... G08B 23/00; G01K 7/12
[52] U.S. Cl. .................... 340/501; 340/507; 340/588; 340/589; 374/181; 374/182; 330/256; 330/266; 330/272; 330/289; 307/310; 307/591; 136/213
[58] Field of Search .............. 340/501, 500, 506, 507, 340/588, 581, 589, 577, 579, 595, 652, 661–664; 374/181, 179, 182; 330/9, 256, 259, 260, 266, 272, 289; 136/213; 307/310, 591

[56] References Cited

U.S. PATENT DOCUMENTS

| | | | |
|---|---|---|---|
| 3,671,953 | 6/1972 | Goldberg | 340/595 |
| 3,921,453 | 11/1975 | Platzer | 374/181 |
| 3,956,686 | 5/1976 | Tanaka | 374/181 |
| 4,120,201 | 10/1978 | Wargo | 374/181 |
| 4,126,042 | 11/1978 | Lynch | 374/181 |

OTHER PUBLICATIONS

Analog Devices, "Two-Terminal IC Temperature Transducer", Oct. 1977.

Electronic Data News (EDN), Aug. 4, 1983, pp. 108, 112–114, 116.
IEEE Journal of Solid State Circuits, vol. SC-15, No. 3, Jun. 1980, Gerard C. M. Meijer.
IEEE Journal of Solid State Circuits, vol. SC-15, No. 6, Dec. 1980, Gerard C. M. Meijer.

Primary Examiner—Donnie L. Crosland
Attorney, Agent, or Firm—Parmelee, Bollinger & Bramblett

[57] ABSTRACT

An integrated-circuit thermocouple signal conditioner having on a single chip an amplifier and a transistor circuit responsive to the chip temperature for developing a cold-junction compensation signal referred to 0° Celsius. The amplifier includes two matched differential input amplifiers the outputs of which are summed and used to control a high-gain main amplifier. Thermocouple signals are applied to one of the input amplifiers, serving as a floating input stage, and the main amplifier output is connected through a feedback network to the input of the other differential amplifier. A cold junction compensation signal also is applied to the input of the other differential amplifier. The compensation is a differential voltage proportional to the Celsius temperature of the chip; the compensation voltage comprises two components having positive and negative temperature coefficients. The IC chip also includes alarm transistors for indicating overload conditions resulting from open-circuited thermocouple leads or other overloads.

27 Claims, 2 Drawing Figures

INTEGRATED-CIRCUIT THERMOCOUPLE SIGNAL CONDITIONER

BACKGROUND OF THE INVENTION

1. Field of the Invention

This invention relates to measuring temperature by the use of thermocouples. More particularly, this invention relates to amplifier circuits operable with thermocouples and providing cold junction compensation.

2. Description of the Prior Art

Thermocouples have been employed for many years to measure temperatures in a wide variety of applications. As is well known, thermocouples produce an output voltage proportional to the temperature difference between the measurement junction (which is exposed to the temperature being measured) and a reference junction (often referred to as the "cold junction"). Since changes in the reference junction temperature will alter the thermocouple output, practical installations include means to stabilize the reference temperature, as by placing the reference junction in an ice bath (0° C.), or means to develop a compensation signal which automatically varies with reference junction temperature in such a way as to maintain the output signal constant for a constant measurement temperature. The present invention relates to means for developing such compensation.

Various techniques have been used for effecting cold junction compensation. For example, a voltage may be developed across a resistor in series with the thermocouple output by supplying the resistor with a current having a first component produced by a constant voltage source and a second component produced by a temperature transducer responsive to the reference junction temperature. A temperature transducer which has been successfully used for this purpose is that identified as the Model AD590, manufactured by Analog Devices, Inc. (assignee of this application), and operable to produce an output current proportional to absolute temperature.

For various reasons, the thermocouple amplifier and compensation arrangements used heretofore have not been fully satisfactory. Accordingly, it is a principal object of this invention to provide an improved thermocouple-amplifier-compensator which eliminates or substantially minimizes the disadvantages of the prior art techniques.

SUMMARY OF THE INVENTION

In a preferred embodiment of the invention, to be described hereinbelow in detail, there is provided an integrated-circuit chip to which the thermocouple leads are connected, and which produces an amplified output signal automatically compensated for changes in the cold junction temperature. The device is very accurate, operates at a low power level (under 800 microwatts), and is not affected by ground connections which may be made at the thermocouple elements.

In the described embodiment, an amplifier with a differential input receives the thermocouple signal and a temperature-responsive compensation signal having a component proportional to absolute temperature of the cold junction. The amplifier output serves as the temperature measurement signal, and is connected through a negative feedback circuit to the amplifier input. Preferably, the amplifier comprises two matched differential-input amplifiers having their outputs connected in summation to the input of a Main Amplifier which drives the feedback circuit. In that configuration, one differential input amplifier receives the thermocouple signal, while the other receives the feedback signal together with the cold junction compensation signal. Advantageously, the compensation signal includes one component which is proportional-to-absolute temperature (PTAT) and connected to one input of the differential amplifier, and a second component which is complementary-to-absolute-temperature (CTAT) and connected to the other input of that amplifier. The two compensation signals together provide zero suppression with a reference point at 0° Celsius.

Other objects, aspects and advantages of the invention will in part be pointed out hereinafter and in part apparent from the following description considered together with the accompanying drawings.

DETAILED DESCRIPTION OF THE PREFERRED EMBODIMENT

Figure 1:
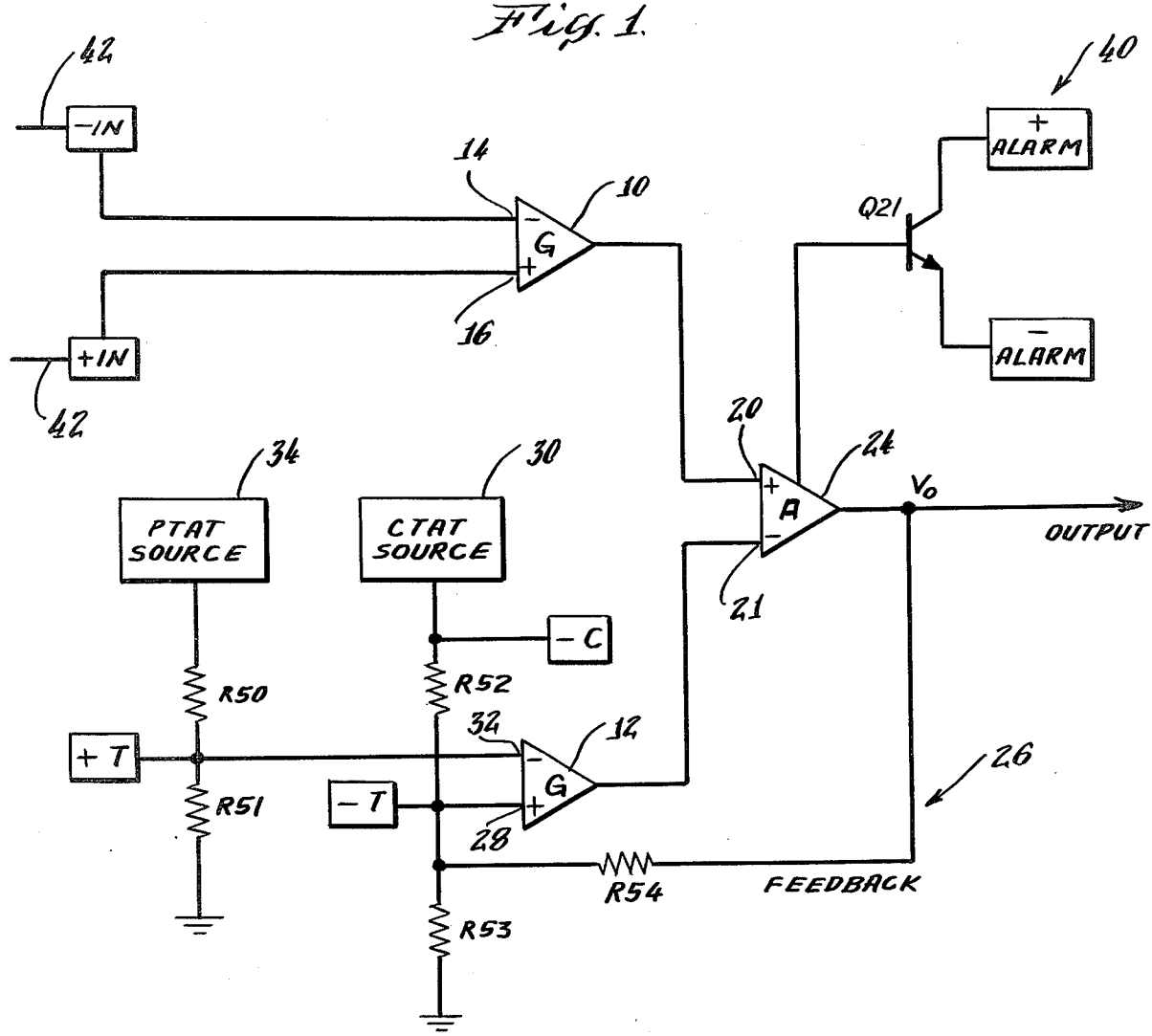
FIG. 1 is a block diagram showing the principal elements of a thermocouple-amplifier-compensator in accordance with the invention.

Referring now to FIG. 1, the thermocouple-amplifier-compensator (TAC) in accordance with the invention comprises a single IC chip formed with a pair of matched differential amplifiers indicated in block format at 10, 12. The input terminals 14, 16 of the upper one of these amplifiers 10 are connected to the −IN and +IN chip terminals to which the thermocouple leads are to be connected. The other differential amplifier 12 receives both a cold junction compensation signal and a feedback signal, as will be described.

The outputs of the differential amplifiers 10, 12 are applied to respective inputs 20, 22 of a Main Amplifier 24 which produces a voltage ($V_o$) representing the summation of its two inputs. This voltage is applied to a negative feedback circuit 26 comprising a resistor R54 connected to the non-inverting input 28 of the lower differential amplifier 12. A CTAT (complementary-to-absolute-temperature) signal from a CTAT source 30 also is applied to this input. The inverting input 32 of the lower amplifier 12 receives a PTAT (proportional-to-absolute-temperature) signal from a PTAT source 34.

It will be seen that the upper differential input amplifier 10 is isolated from the feedback circuit 26. Thus the thermocouple can be connected directly to the input terminals +IN and −IN without loading from the feedback circuit.

Changes in thermocouple voltage applied differentially to the upper amplifier 10 are converted to a single-ended signal driving the Main Amplifier 24. The output of the Main Amplifier changes correspondingly to drive the lower amplifier 12 through the feedback circuit 26. The feedback forces the voltage between the Main Amplifier input terminals 20, 22 towards zero. To achieve this result, the feedback forces the differential input of the lower amplifier 12 to equal the differential input of the upper amplifier 10, since the two input amplifiers are matched.

The output signal resulting from this circuit arrangement is the same as though the thermocouple signal had been coupled directly into the inverting input of the lower amplifier 12. That is, what might be termed a "virtual thermocouple" is in effect connected in the input circuit of the amplifier. However, since there is actually a separate floating amplifier input for the thermocouple signal, the input from the thermocouple is not constrained to be "ground referenced", and can be used within a practical common-mode range.

The inverting input 32 of the lower amplifier receives at PTAT cold junction compensation signal from the PTAT source 34. This compensation signal thus is referenced to absolute zero. However, because it is preferred to reference thermocouple compensation to zero degrees Celsius, an additional compensation signal is provided to achieve that result. Such additional compensation could be in the form of a fixed voltage to offset or zero-suppress the PTAT compensation signal. However, special and expensive means would be needed to hold the voltage sufficiently closely to the fixed value to provide suitably accurate temperature measurements. To avoid such a requirement, a superior technique is employed in the disclosed embodiment. This technique comprises driving the non-inverting input 28 of the lower amplifier 12 with a CTAT compensation signal, i.e. a signal having a temperature coefficient which is opposite in sign to that of the PTAT signal on the inverting input.

The compensation circuitry is so arranged that the CTAT voltage at the non-inverting input 28 of the lower amplifier 12 is, at 0° C., essentially equal to the PTAT voltage on the inverting input 32. Thus, if the chip were at 0° C., its output ($V_o$) would reflect only the thermocouple voltage. At other chip temperatures, both the PTAT and the CTAT voltages will change to develop a net compensation signal equal to the voltage which would be produced by a thermocouple having its measurement junction at the chip temperature and its reference junction at 0° C. Consequently, the output signal ($V_o$) consists of a voltage proportional to the thermocouple input voltage (referenced essentially to the actual chip temperature), plus a voltage proportional to the difference between the chip temperature and 0° C. The result is the same as if the output of a thermocouple referred to 0° C. was simply amplified. Therefore, the amplified output of the circuit is an accurate representation of the thermocouple temperature but without the requirement for an actual 0° C. reference temperature.

Alarm circuitry generally indicated at 40 is provided to indicate when either (or both) of the thermocouple leads 42 to the +IN and −IN terminals is open. Such open circuit overloads the Main Amplifier 34 to cause an alarm-sensing transistor Q21 to switch on, as described below.

Figure 2:
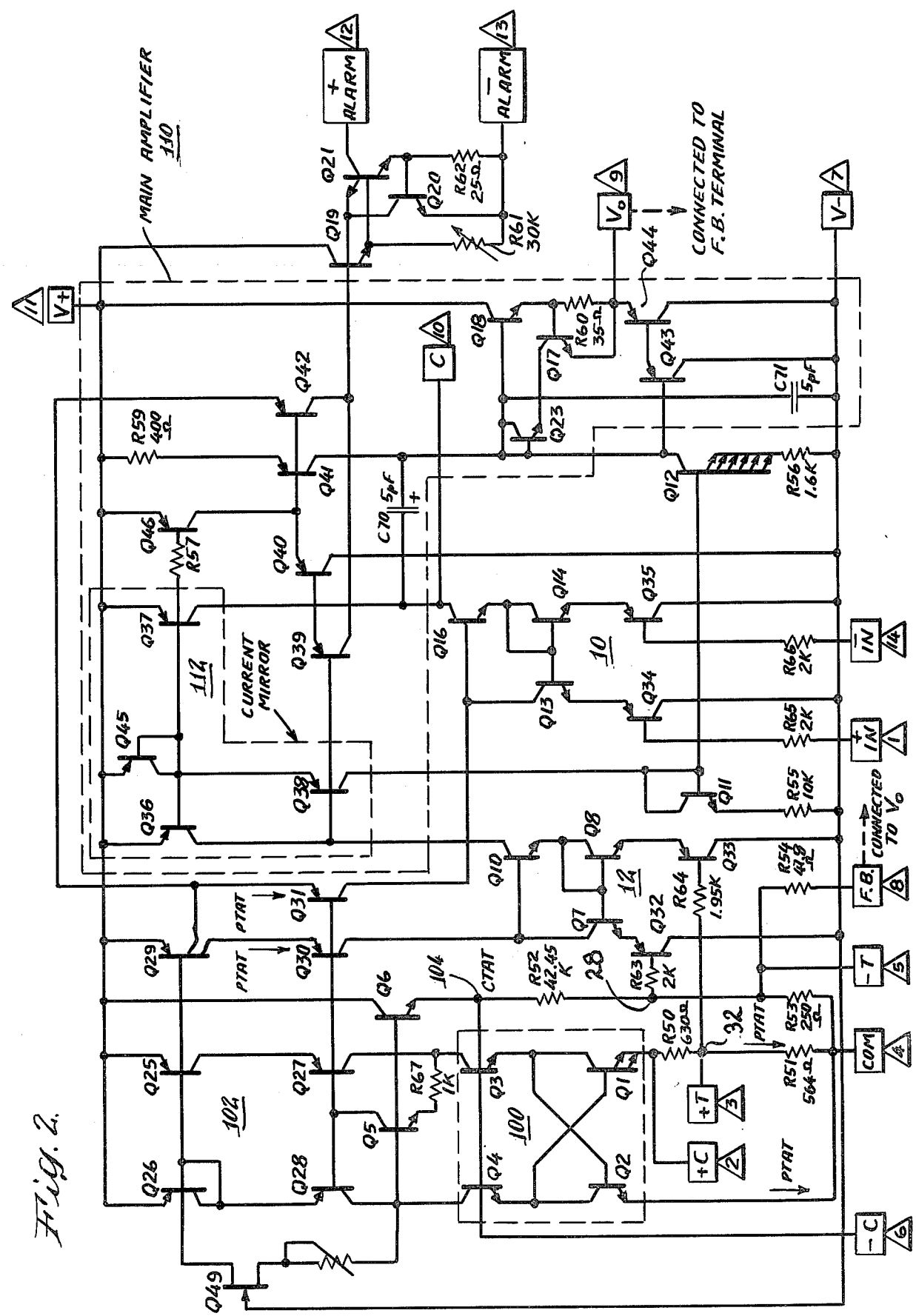
FIG. 2 is a detailed schematic diagram of a preferred embodiment of the invention.

Turning now to the description of the preferred embodiment in more detail, and referring to FIG. 2, the basic bias current is derived from a crossed-quad circuit generally indicated at 100 and consisting of Q1, Q2, Q3, and Q4. (Note: Background information on crossed-quad circuits may be found in U.S. Pat. No. 4,268,759 issued to Barrie Gilbert on May 19, 1981.) Base current for Q3 and Q4 is provided by Q6 when its base is driven positive by the quad excitation current, provided initially by an FET Q49. Excitation of the quad by current in Q4 and Q2 stabilizes the emitter voltage of Q1. Since Q1 is a double-emitter transistor, this voltage with respect to common at the emitter of Q2 is given by the expression:

$$V_{E1} = (kT/q) \ln 2$$

This voltage is developed across the resistors R50 and R51, resulting in a PTAT current flow in Q1 and Q3.

The transistors Q25, Q26, Q27 and Q28 make up an improved Wilson current mirror generally indicated at 102. Q5 adds a modification refered to as the Congdon improvement. The small resistor, R69, together with the augmented collector-base capacitance of Q27 are for frequency stabilization of the loop closed by Q5.

The amplifier-compensator disclosed herein is capable of operation with a negative supply voltage ranging from zero to −25 volts, so that the gate bias applied to Q49 is subjected to wide variation. The addition of R68 reduces the resulting variation in actual drain current. The FET-Resistor combination provides a minimum bias current which is sufficient to initiate current flow in the crossed-quad 100 at turn on. The PNP current mirror 102 inverts this current and reflects it back regeneratively on the Q2, Q4 side. This current will rise to a PTAT value controlled by R50 and R51 and the voltage $V_{E1}$. The maximum drain current of Q49 must be less than this PTAT current to permit the proper bias levels to be established.

Once the circuit has been turned on, PTAT current having a magnitude determined by R50 and R51 flows in both sides of the crossed-quad 100 so that base current errors are minimized. Both Q2 and Q3 operate at the same PTAT current. As a result, the base voltage of Q3 is well defined and is used to produce a CTAT signal at circuit point 104. This voltage is reduced by the divider consisting of R52 and R53 to develop the required CTAT temperature-offset signal. The feedback resistor R54 connects to this reduced voltage which drives Q32 by way of R63. This connection corresponds to the lower non-inverting input 28 of FIG. 1. The resistor R63 acts to balance out the voltage drop produced by base current in the thermocouple input protection resistor R65.

The inverting input 32 of the amplifier 12 applies the PTAT compensation signal from the voltage divider R50/R51 through a base current compensator R64 to Q33. The voltage at the junction of R50 and R51 is a properly-scaled version of the PTAT voltage at the emitter of Q1. The two PNP transistors Q32 and Q33 may be considered as emitter followers driving the emitters of Q7 and Q8 which, along with Q10, are connected in a fashion similar to a Wilson current mirror. The "bottom" of the mirror does not have a common connection for Q7 and Q8, however. Instead, the differential input voltage is applied between them. This voltage disturbs the mirroring so that the ratio between input and output current is a function of the input signal applied to Q32 and Q33. PTAT input current for the Q7, Q8 and Q10 arrangement is supplied from Q30.

The upper differential amplifier 10 shown in FIG. 1 is implemented by Q34, Q35, Q13, Q14, and Q16. This configuration is identical to the amplifier circuit 12 used as the temperature compensation and feedback input, and is driven by a PTAT current from Q31 which is matched to that in Q30. The output current from Q16 of the input stage 10 is compared to the current from Q10 of the other input stage 12 to control the Main Amplifier generally indicated at 24. The Main Amplifier output $V_o$ drives the feedback through resistor R54 to minimize the difference between the currents of Q10 and Q16.

The difference of these two currents is derived from a current mirror 112 consisting of Q36, Q37, Q38 and Q45. The net current at the collectors of Q16 and Q37 drives the base of emitter follower Q40 which in turn drives the base of a voltage gain stage Q41. The collector of Q41 is opposed by the collector of Q12, which produces its operating bias. The collector voltage of Q41 drives the base of emitter follower Q18 which then drives the chip output pin ($V_o$) through R60, the positive current limit resistor. The collector of Q41 also drives the Darlington-connected PNPs Q43 and Q44 so that the output can sink current when driving negative output signals. Negative current limiting is provided by high current $\beta$ reduction in these two transistors, and the limited drive current available from Q12.

The drive current for Q12 is derived from the output current of the temperature feedback input amplifier 12. More specifically, the current from Q10 drives the main differencing current mirror 112 just described. Within this current mirror Q36, Q38 and Q45 form another Wilson mirror, with the collector current of Q38 mirroring the input current from Q10. The current from Q38 drives the one-to-six ratio mirroring arrangement consisting of Q11, R55, Q12 and R56.

One of the additional biasing arrangements is provided by Q29 which is a split collector PNP driven by the base voltage produced at Q25. This base voltage causes the emitter current Q29 to equal the emitter current of Q25, which approximates the basic PTAT bias. This current, less the base current, is accurately split at the collector and biases the matched input stages 10, 12 by way of the cascade PNPs Q30 and Q31 referred to previously.

Another bias current is derived by Q46 from the base voltage of the differencing mirror 112. This current biases Q40. The resistor R57 reduces the base drive slightly so that the sum of the collector current of Q46 with the base current of Q41 will approximate the emitter current of Q38. This compensation minimizes the error which would result from a difference in the base currents of Q38 and Q40.

Positive current limiting is provided by Q17. When the load current is sufficient to develop about 600 mV across R60, Q17 comes on and steals away the base drive to Q18 by way of Q23. The function of Q23 is to disconnect the collector-base junction of Q17 when negative loads are being driven. Without Q23, the collector-base of Q17 would be a forward-biased diode from the base of Q43 to the output.

When Q17 comes on to steal the drive from Q18, the amplifier section will drive Q41 to high current levels until it becomes overloaded. To control on-chip dissipation, the collector current of Q41 is also limited. This limiting is accomplished by means of Q42 and R59. In normal operation R59 has only a minor effect in reducing loop gain. When Q41 is driven hard in overload conditions, however, Q59 allows the emitter and hence the base to go negative. As this happens, the base of Q42 also is driven negative. Since its emitter is connected to the emitter of Q31, the base-emitter of Q42 begins to be forward-biased by the excess drive to Q41. As a result the emitter current of Q31 is stolen away which reduces the drive to the thermocouple input stage 10. This reduction reduces the drive to Q40 and Q41 by way of Q16 until an equilibrium is reached.

In the event of positive output overload, the collector current of Q42 is used to activate the alarm circuit. This current, which is normally zero, will rise if the amplifier output is overloaded or if the inputs are overloaded in the direction to drive the output positive. The base current of Q34 will result in such an input overload if the +IN thermocouple input pin is open-circuited. Alternatively, if the −IN thermocouple input pin (or both + and −) are open-circuited, the collector current of Q16 will drop to zero allowing the main current mirror 112 to swing the base of Q40 positive. Since the input to the mirror from Q10 will be unaffected by thermocouple input overloads, the collector of Q37 will swing positive until the base-emitter of Q39 becomes forward-biased. At this point, the output current of the mirror will appear at the collector of Q39 which is, effectively, in a common base configuration.

For any combination of overloads, the combined collector current of Q39 and Q42 will rise from the normal zero level. This current will drive the base of Q19 which drives Q21 in a Darlington connection. Therefore, Q21 will be driven on whenever an overload exists. Resistor R61 is the base hold-down for Q21 to carry away leakage and $\beta$-multiplied leakage from Q19. Generally, it is assumed, Q21 will be employed as a switch to signal the overload. Since it may be connected in a variety of configurations, overload protection is included. The emitter current of Q21 flowing through R62 develops a voltage across the base-emitter of Q20. When this voltage becomes sufficiently large, Q20 will come on and steal away the remaining base drive to Q19. The circuit will reach an equilibrium with a safe level of current in Q21.

The collector current of Q19 is limited only by the available base drive, and by the $\beta$ of Q19. The base drive is controlled when Q21 is in current-limited operation. If Q21 is lightly loaded, the collector current of Q19 can become quite high. An extra emitter dot on Q21 is used as an inverted collector to control the drive of Q19. If Q21 is driven into saturation, the collector-base will be forward biased. As a result, the inverted collector will conduct and carry away base drive to Q19 which is in excess of that required to maintain Q21 saturated.

If either the alarm or normal output is overloaded, the chip dissipation will rise substantially. The resulting temperature change will disturb the cold-junction compensation and the output may be in error when the overload is corrected. Proper operation will be restored when the chip is allowed to cool to ambient temperature.

The circuit is designed to continue operating with the negative supply voltage reduced to zero so long as negative output voltages are not required. The +C, −C, +T, −T Feedback and output points are made available so that the circuit can be fine-trimmed. The circuit values were selected for use with Type J thermocouples, but the divider ratios can be changed substantially to accommodate thermocouples other than Type J.

It may be noted that the voltage-to-current transfer function of the input stages 10, 12 is non-linear, but this non-linearity does not appear in the amplified output signal $V_o$. Since with the two stages matched the feedback causes the lower or reference input 12 to be driven to the same differential signal as the upper or thermocouple input 10, the non-linearity does not enter into the overall closed-loop transfer function.

The circuit arrangement described hereinabove is arranged to provide for ready calibration. The magnitude of the PTAT voltage delivered to terminal 28 can be adjusted to the proper value by trimming R50 or R51. Similarly, the magnitude of the CTAT voltage delivered to terminal 32 can be adjusted to the proper value by trimming R52 or R53, to suppress the zero to 0° Celsius. The overall gain of the amplifier can be adjusted by trimming the feedback resistor R54, either by itself, or in conjunction with further trimming of the zeroizing resistors.

A special feature of the amplifier arrangement described above is that the net offset voltage of the amplifier inputs acts in series with the PTAT voltage applied to terminal 32. Imperfections in the fabrication process are predominantly manifested as PTAT offset voltages in the amplifiers. Consequently, it will be seen that the effects of such offsets and offset drift are virtually eliminated by properly trimming the network of resistors, as described above, such that the magnitude of the PTAT source is set to include the effect of the offset voltages. The PTAT offset voltage can be considered as being part of the PTAT compensation voltages, which eliminates such offset voltages as an error factor since the amplifier will be trimmed to provide a net PTAT voltage, including offset, providing accurate operation. It may also be noted that the operating bias for the amplifier is derived from the PTAT source to tend to assure that all offsets traceable to bias current effects will be PTAT.

The amplifier of the preferred embodiment disclosed herein also advantageously includes circuit means to provide that the output signal corresponds to the input signal for thermocouple voltages which range down to the voltage of the negative supply rail (V−). To this end, the input circuit of the amplifier 10 comprises a pair of PNP transistors Q34/Q35 which are capable of operation at such voltage levels.

We claim:

1. An IC chip to which a thermocouple may be connected to produce a temperature measurement signal with reference junction compensation, said chip having formed thereon:
   amplifier means having differential input means;
   thermocouple input terminal means connected to said input means and providing a reference junction at the chip temperature when connected to thermocouple leads;
   temperature-responsive signal source means formed as part of said chip and coupled to said input means additively with respect to the thermocouple signal, the signal produced by said signal source means effecting reference junction compensation corresponding to changes in the chip temperature; and
   a negative feedback circuit connected between the output of said amplifier means and said input means;
   the feedback of said feedback circuit forcing the output of said amplifier to vary in correspondence to changes in the thermocouple voltage resulting from changes in the measurement temperature.

2. An IC chip according to claim 1 wherein said signal source means comprises a PTAT source.

3. An IC chip according to claim 1, including a CTAT signal source connected to said amplifier input means to apply thereto a voltage to effect zero suppression of the reference junction compensation;
   said reference junction compensation providing a voltage simulating the thermocouple output voltage when the thermocouple measurement junction is at the chip temperature and the reference junction is at 0° Celsius.

4. An IC chip according to claim 3, wherein said CTAT signal source is arranged to produce a net compensation signal referenced to zero degrees Celsius.

5. An IC chip according to claim 1, wherein said signal source means comprises a PTAT signal source and a CTAT signal source arranged to produce a net compensation signal referenced to zero degrees Celsius.

6. An IC chip according to claim 1, wherein said amplifier means comprises first and second matched differential amplifiers with their outputs connected together in summation;
   said thermocouple input terminal means being connected to said first differential amplifier;
   said feedback circuit being connected to the input of said second differential amplifier.

7. An IC chip according to claim 6, wherein said temperature-responsive signal source means is connected to the input of said second differential amplifier.

8. An IC chip according to claim 7, wherein said temperature-responsive signal source means comprises a PTAT signal source and a CTAT signal source.

9. An IC chip according to claim 8, wherein said second differential amplifier includes first and second input terminals;
   said PTAT signal source being connected to one of said input terminals;
   said CTAT signal source being connected to the other of said input terminals.

10. An IC chip according to claim 1, wherein said temperature-responsive signal source means comprises a set of interconnected transistors at least one of which has a substantially different current density than another of said transistors, thereby to produce a PTAT voltage for compensating the reference junction.

11. An IC chip according to claim 1, wherein said temperature-responsive signal source means comprises a transistor carrying a PTAT current so as to develop between the base and emitter thereof a CTAT voltage for compensating the thermocouple reference junction.

12. An IC chip to which a thermocouple may be connected to produce a temperature measurement signal with reference junction compensation, said chip having formed thereon:
   amplifier means having input means and output means, said output means producing an output measurement signal which varies in correspondence to changes in the temperature measurement signal;
   thermocouple input terminal means connected to said input means;
   temperature-responsive signal source means forming part of said chip and coupled to said input means to effect reference junction compensation corresponding to changes in the chip temperature;
   an alarm transistor; and
   alarm circuit means coupled to said amplifier means and responsive to variations in the temperature measurement signal, said alarm circuit means including means for actuating said alarm transistor in the event that a thermocouple lead becomes open-circuited.

13. An IC chip according to claim 12, wherein said alarm circuit means includes means operable to activate said alarm transistor in the event there is an overload on the output of the amplifier means.

14. An IC chip according to claim 12, including current-limiting means coupled to said alarm transistor to prevent excessive current flow therethrough.

15. An IC chip including a thermocouple amplifier with reference junction compensation comprising:
a first differential amplifier having an input circuit arranged to receive the thermocouple signal;
a pair of thermocouple input terminals connected to said input circuit;
a second differential amplifier matched to said first amplifier;
a main amplifier combining the outputs of said two amplifiers to produce an output signal corresponding to the difference between said outputs;
a negative feedback circuit connecting the output of said combining means to the input of said second differential amplifier; and
signal source means forming part of said IC chip and coupled to the input of said second differential amplifier to effect reference junction compensation;
said input circuit of said first differential amplifier being isolated from any feedback, to assure that the thermocouple leads are presented with an amplifier input impedance unaffected by feedback circuitry.

16. Apparatus as claimed in claim 15, wherein said signal source means comprises a PTAT source.

17. Apparatus as claimed in claim 16, wherein said signal source means comprises means to zero suppress the compensation signal developed by said PTAT source to provide a reference point at 0° Celsius.

18. Apparatus as claimed in claim 17, wherein said zero suppression means comprises a CTAT signal source.

19. An IC chip to which a thermocouple may be connected to produce a temperature measurement signal with reference junction compensation, said chip having formed thereon:
amplifier means having input means and output means;
thermocouple input terminal means connected to said input means;
temperature-responsive signal source means coupled to said input means to effect reference junction compensation corresponding to changes in the chip temperature;
said temperature-responsive signal source means producing a compensation signal corresponding to a reference temperature of zero degrees Celsius.

20. An IC chip according to claim 19, wherein said signal source means comprises a PTAT source and a second signal source arranged to zero-suppress the compensation signal to produce a composite compensation signal corresponding to zero degrees Celsius.

21. An IC chip according to claim 20, wherein said second signal source includes a CTAT signal source.

22. An IC chip to which a thermocouple may be connected to produce a temperature measurement signal with reference junction compensation, said chip having formed thereon:
amplifier means having input means and output means;
thermocouple input terminal means connected to said input means and presenting an impedance to thermocouple leads connected to said input terminal means;
said input means being isolated from all other portions of said amplifier means to assure that the impedance presented to thermocouple leads connected to said input terminal means will be unaffected by connections from said input means to such other portions;
transistor means;
circuit means connected to said transistor means to produce therefrom a signal responsive to the temperature of the chip and serving as a reference junction compensation signal which changes in correspondence with changes in the chip temperature;
said circuit means including means connecting said reference junction compensation signal to said amplifier to act together with the thermocouple signal at said input means to determine the output of said amplifier means.

23. An IC chip according to claim 22, wherein said transistor means includes means to produce a zero-suppression signal responsive to the chip temperature.

24. An IC chip to which a thermocouple may be connected to produce a temperature measurement signal with reference junction compensation, said chip having formed thereon:
amplifier means with input and output means;
said amplifier means having a PTAT offset voltage;
thermocouple input terminal means connected to said input means;
PTAT signal source means coupled to said input means to effect reference junction compensation corresponding to changes in the chip temperature;
the output of said PTAT signal source means being adjustable in magnitude to provide for zeroizing of the amplifier with the PTAT offset voltages effectively combined with the output of said PTAT signal source means to substantially minimize error effects due to changes in the offset voltages with changes in temperature of the chip.

25. An IC chip according to claim 24, including means to supply PTAT bias currents to said amplifier means.

26. An IC chip to which a thermocouple may be connected to produce a temperature measurement signal with reference junction compensation, said chip having formed thereon:
amplifier means with input means and output means;
thermocouple input terminal means connected to said input means;
temperature-responsive signal source means coupled to said input means to effect reference junction compensation corresponding to changes in the chip temperature;
positive and negative supply rails for said amplifier means; and
circuit means forming part of said amplifier means for controlling the output of said amplifier at thermocouple voltages which range down to the voltage of said negative supply rail.

27. An IC chip according to claim 26, wherein said amplifier input means comprises a balanced pair of PNP transistors the bases of which are connected to said thermocouple input terminal means;
the collectors of said transistors being connected to said negative supply rail.

* * * * *